(12) United States Patent
Black et al.

(10) Patent No.: US 7,966,951 B1
(45) Date of Patent: Jun. 28, 2011

(54) APPARATUS FOR DISPENSING UTILITIES AT A SELECTED LOCATION OF A WORKSTATION

(75) Inventors: Dave Black, Orange, CT (US); Harry Proscino, Hamden, CT (US)

(73) Assignee: Premier Manufacturing Group, Inc., Shelton, CT (US)

( * ) Notice: Subject to any disclaimer, the term of this patent is extended or adjusted under 35 U.S.C. 154(b) by 378 days.

(21) Appl. No.: 12/106,231

(22) Filed: Apr. 18, 2008

Related U.S. Application Data (60) Provisional application No. 61/038,079, filed on Mar. 20, 2008.

(51) Int. Cl.
*A47B 37/00* (2006.01)

(52) U.S. Cl. ............... 108/50.02; 108/50.01; 312/223.6; 312/223.1; 312/223.3

(58) Field of Classification Search ............... 108/50.01, 108/50.02, 26, 64, 92, 93, 94, 86; 312/223.6, 312/223.1, 223.3, 322; 220/3.8, 3.2, 241
See application file for complete search history.

(56) References Cited

U.S. PATENT DOCUMENTS

| | | | |
|---|---|---|---|
| 4,654,756 A | 3/1987 | Wilson | |
| 4,792,881 A * | 12/1988 | Wilson et al. | 312/223.6 |
| 5,008,491 A * | 4/1991 | Bowman | 174/489 |
| 5,230,552 A | 7/1993 | Schipper | |
| 5,231,562 A | 7/1993 | Pierce | |
| 5,709,156 A | 1/1998 | Gevaert | |
| 6,162,071 A * | 12/2000 | Muller | 439/142 |
| 6,254,206 B1 * | 7/2001 | Petrick et al. | 312/223.6 |
| 6,283,043 B1 * | 9/2001 | Stern et al. | 108/50.02 |
| 6,327,983 B1 * | 12/2001 | Cronk et al. | 108/50.02 |
| 6,338,301 B1 * | 1/2002 | Almond | 108/50.02 |
| 6,397,762 B1 | 6/2002 | Goldberg | |
| 6,435,106 B2 * | 8/2002 | Funk et al. | 108/50.02 |
| 6,647,900 B1 * | 11/2003 | Kopish | 108/50.02 |
| 6,881,080 B2 | 4/2005 | Macaluso | |
| 6,979,209 B2 * | 12/2005 | Griepentrog | 174/57 |
| 7,205,488 B2 * | 4/2007 | Riner | 174/50 |
| 2005/0268823 A1 * | 12/2005 | Bakker et al. | 108/50.02 |
| 2006/0096506 A1 * | 5/2006 | Brauning et al. | 108/50.02 |

* cited by examiner

*Primary Examiner* — José V Chen
(74) *Attorney, Agent, or Firm* — Raymond A. Nuzzo (57) ABSTRACT

An apparatus for dispensing utilities at a selected location of a work station. The apparatus has a housing that has an upper peripheral portion and a pair of oppositely positioned sidewalls that extend downwardly from the upper peripheral portion. The housing defines a spatial region between the sidewalls. The housing has an opening that is bounded by the upper peripheral portion and in communication with the spatial region. An inner support structure is attached to and between the sidewalls of the housing and located within the spatial region of the housing. The inner support structure has sidewalls, a bottom portion and a pair of lengthwise panel members that define a spatial region of the inner support structure. The inner support structure has a generally "V" shape cross-section wherein the lengthwise panels are angulated with respect to the bottom portion and away from each other. A utility receptacle module is attached to each lengthwise panel. Each utility receptacle module has at least one utility receptacle that is in communication with and accessible through the spatial region of the inner support structure. A cable extends from each utility receptacle module and is in electrical signal communication with the utility receptacle. Two lid members are movably attached to the housing of the inner support structure. Each lid member is movable between a closed position and an open position that provides access to the spatial region of the inner support structure and the utility receptacles.

1 Claim, 14 Drawing Sheets

APPARATUS FOR DISPENSING UTILITIES AT A SELECTED LOCATION OF A WORKSTATION

CROSS-REFERENCE TO RELATED APPLICATIONS

This application claims the benefit of U.S. Provisional Application No. 61/038,079, filed Mar. 20, 2008.

TECHNICAL FIELD

The present invention generally relates to an apparatus for dispensing utilities at a selected location of a workstation such as a table, desk, workbench or other surface.

BACKGROUND ART

Devices for distributing utilities in combination with tables, desks, workbenches or other work surfaces are known in the art. Typical prior art devices are described in U.S. Pat. Nos. 5,230,552 and 5,709,156.

DISCLOSURE OF INVENTION

The present invention comprises an apparatus for dispensing utilities at a selected location of a work station that has a work surface. In one embodiment, the apparatus generally comprises a housing that has an upper peripheral portion and a pair of oppositely positioned sidewalls that extend downwardly from the upper peripheral portion. The housing defines a spatial region between the sidewalls. The housing has an opening that is bounded by the upper peripheral portion and in communication with the spatial region. An inner support structure is located within the spatial region of the housing and located between and attached to the sidewalls of the housing. The inner support structure comprises a pair of sidewalls, a bottom portion and a pair of lengthwise panel members. The inner support structure defines a spatial region and has a generally "V" shape cross-section such that each lengthwise panel is angulated with respect to the bottom portion. At least one utility receptacle module is attached to each lengthwise panel. The utility receptacle module has at least one utility receptacle that is in communication with and accessible through the spatial region of the inner support structure. Each utility receptacle module has a cable extending therefrom which is in electrical signal communication with the utility receptacle. Two lid members are movably attached to the sidewalls of the housing. Each lid member is movable between a closed position and an open position that provides access to the spatial region of the inner support structure. The lid members are sized so that when both lid members are closed, a gap exists between the lid members. The gap is sized to permit wires or cables connected to electrical equipment to pass through the gap and remain connected to the utility receptacles when the lid members are closed.

Other embodiments of the apparatus of the present invention are disclosed herein.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

BEST MODE FOR CARRYING OUT THE INVENTION

As used herein, the term "utility receptacle" refers to power receptacles, telephone receptacles or jacks, audio signal receptacles and connectors, video signal receptacles and connectors, and computer data receptacles, connectors or ports, including USB ports.

Figure 1:
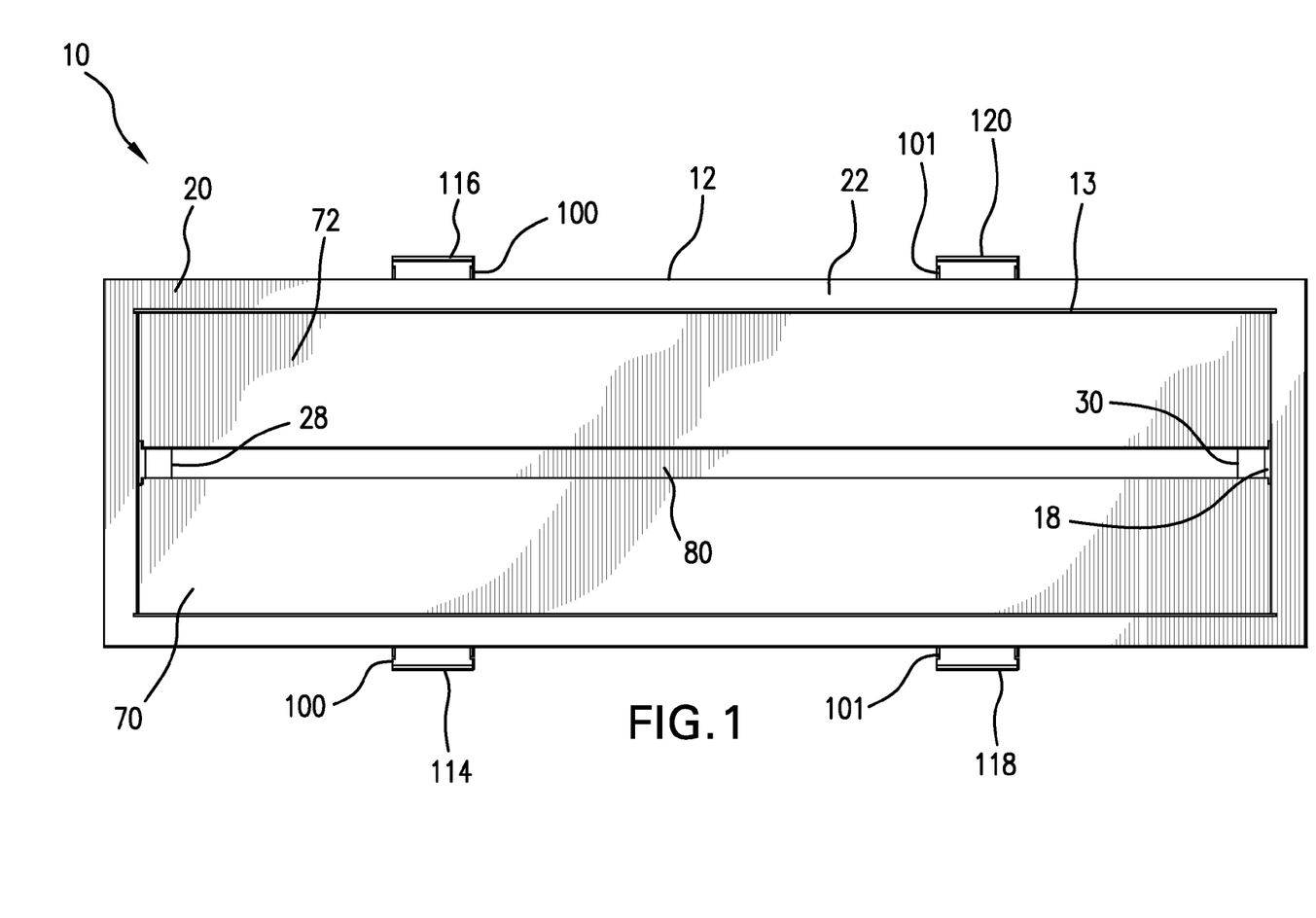
FIG. 1 is a top, plan view of an apparatus for dispensing utilities at a selected location of a workstation in accordance with one embodiment of the present invention, the view showing lid members of the apparatus in a closed position.
Figure 2:
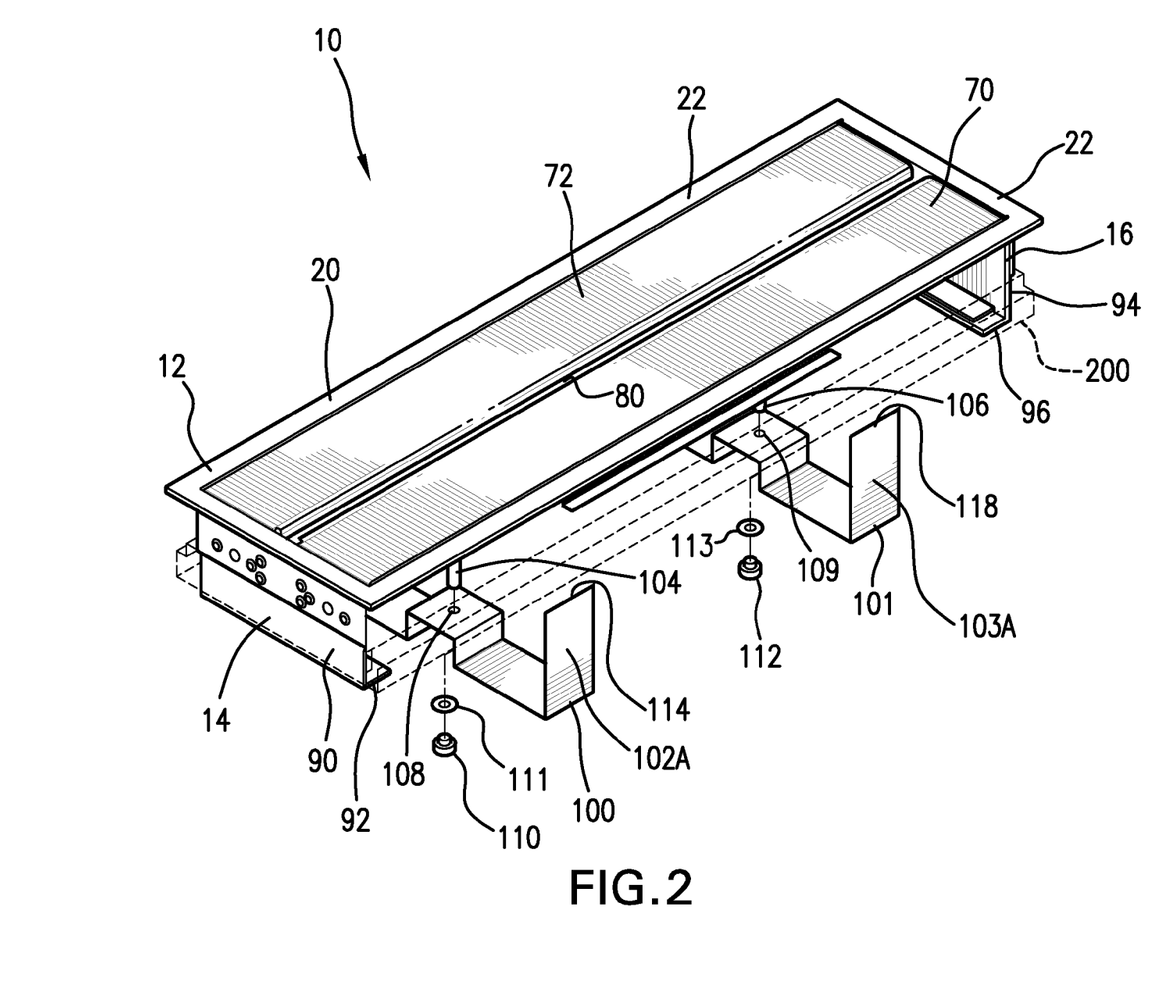
FIG. 2 is a perspective view of the apparatus of FIG. 1, the lid members of the apparatus being shown in the closed position.
Figure 3A:
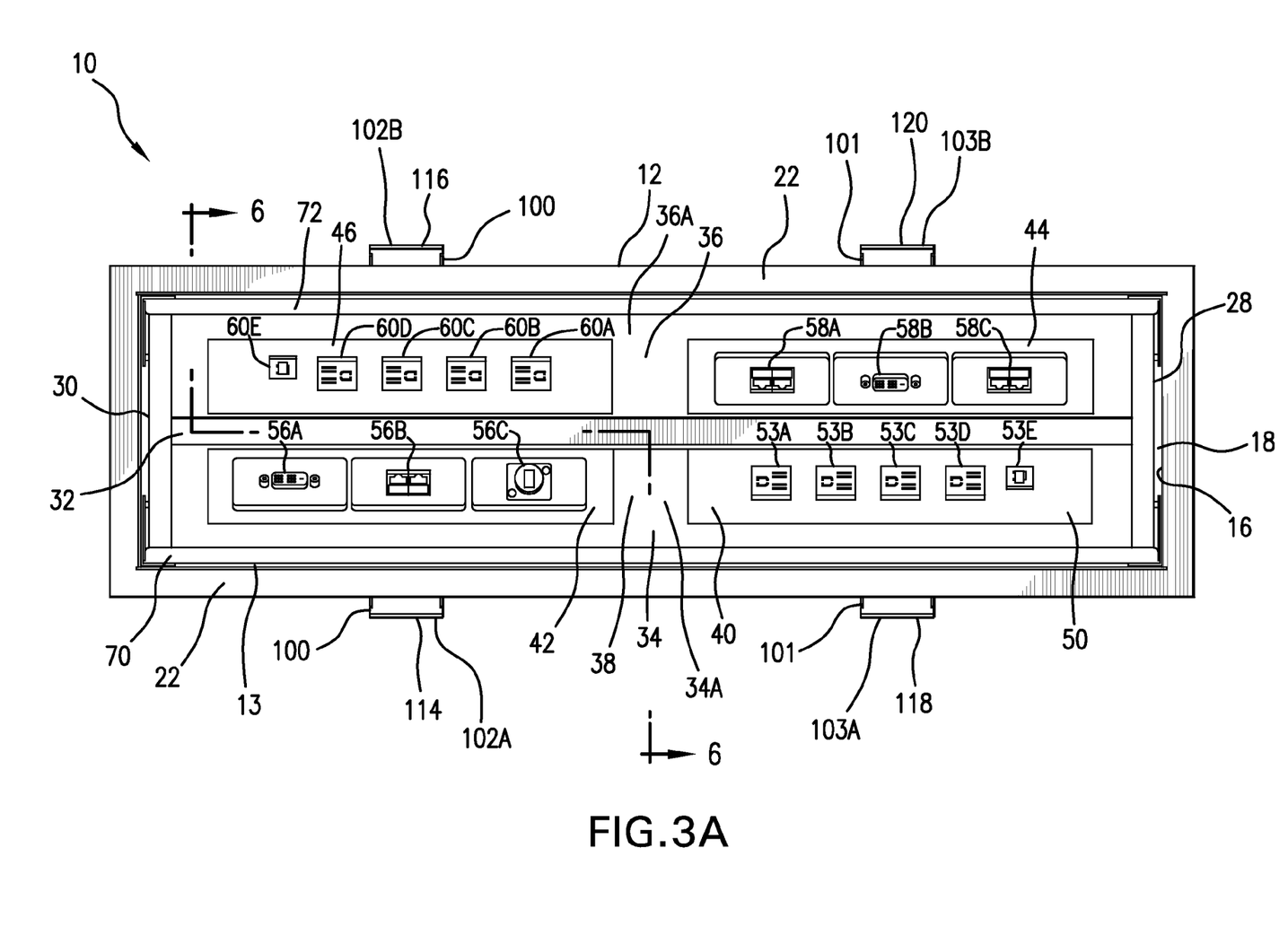
FIG. 3A is a top, plan view of the apparatus of FIG. 1, the view showing the lid members in an open position.
Figure 4:
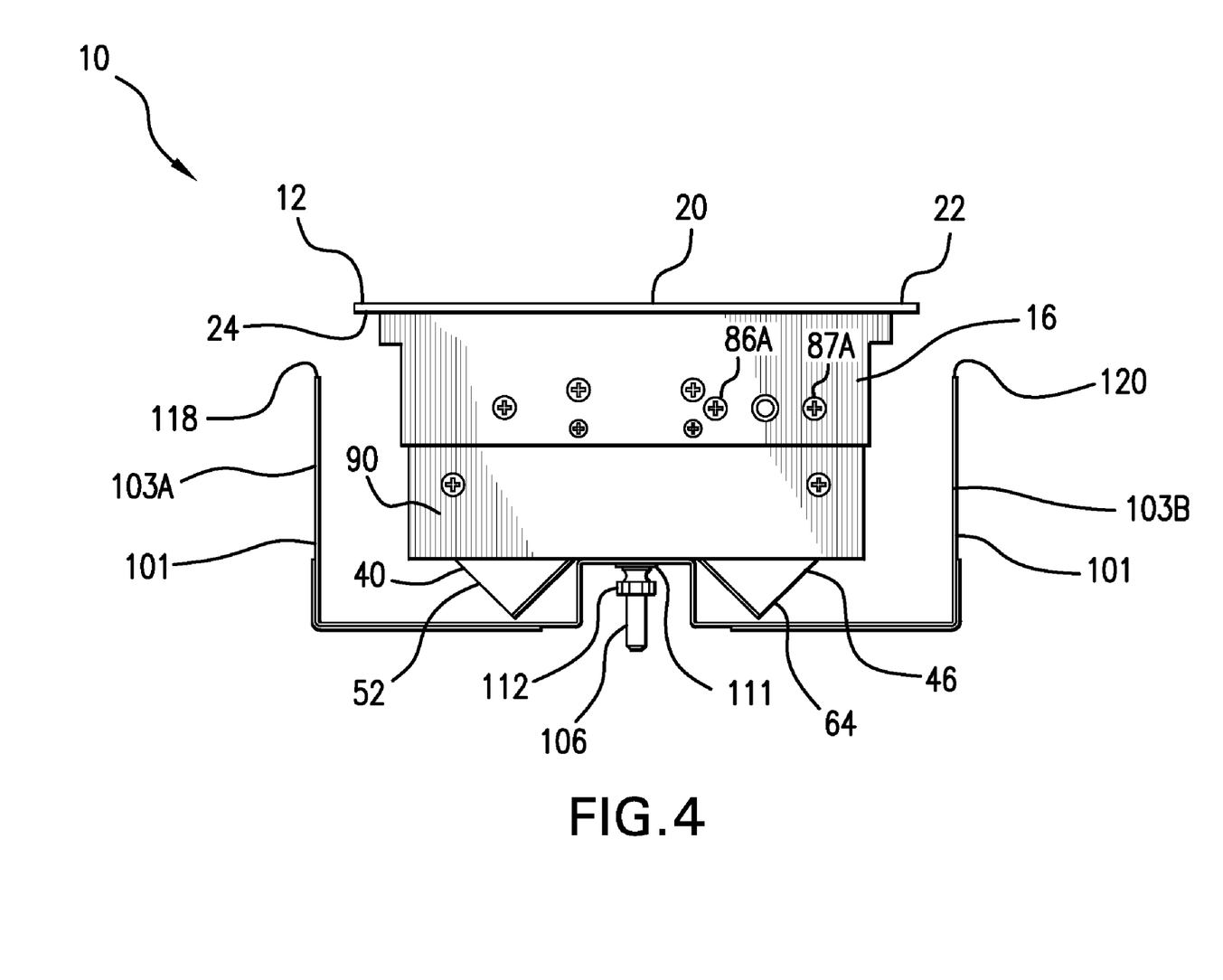
FIG. 4 is a view of the right side of apparatus of FIG. 1, the view of the left side being essentially the same.

Referring to FIGS. 1, 2 and 4, there is shown apparatus 10 for dispensing utilities at a selected location of a work station that has a work surface. Apparatus 10 generally comprises housing 12 that defines opening 13. Housing generally comprises a pair oppositely positioned sidewalls 14 and 16 and defines a space or spatial region 18 that is between sidewalls 14 and 16 (see FIGS. 3A and 6) and is in communication with opening 13. Housing 12 further includes peripheral portion 20. Opening 13 is bounded by peripheral portion 20. Peripheral portion 20 has top surface 22 and bottom surface 24. Sidewalls 14 and 16 extend downwardly from peripheral portion 20.

Figure 6:
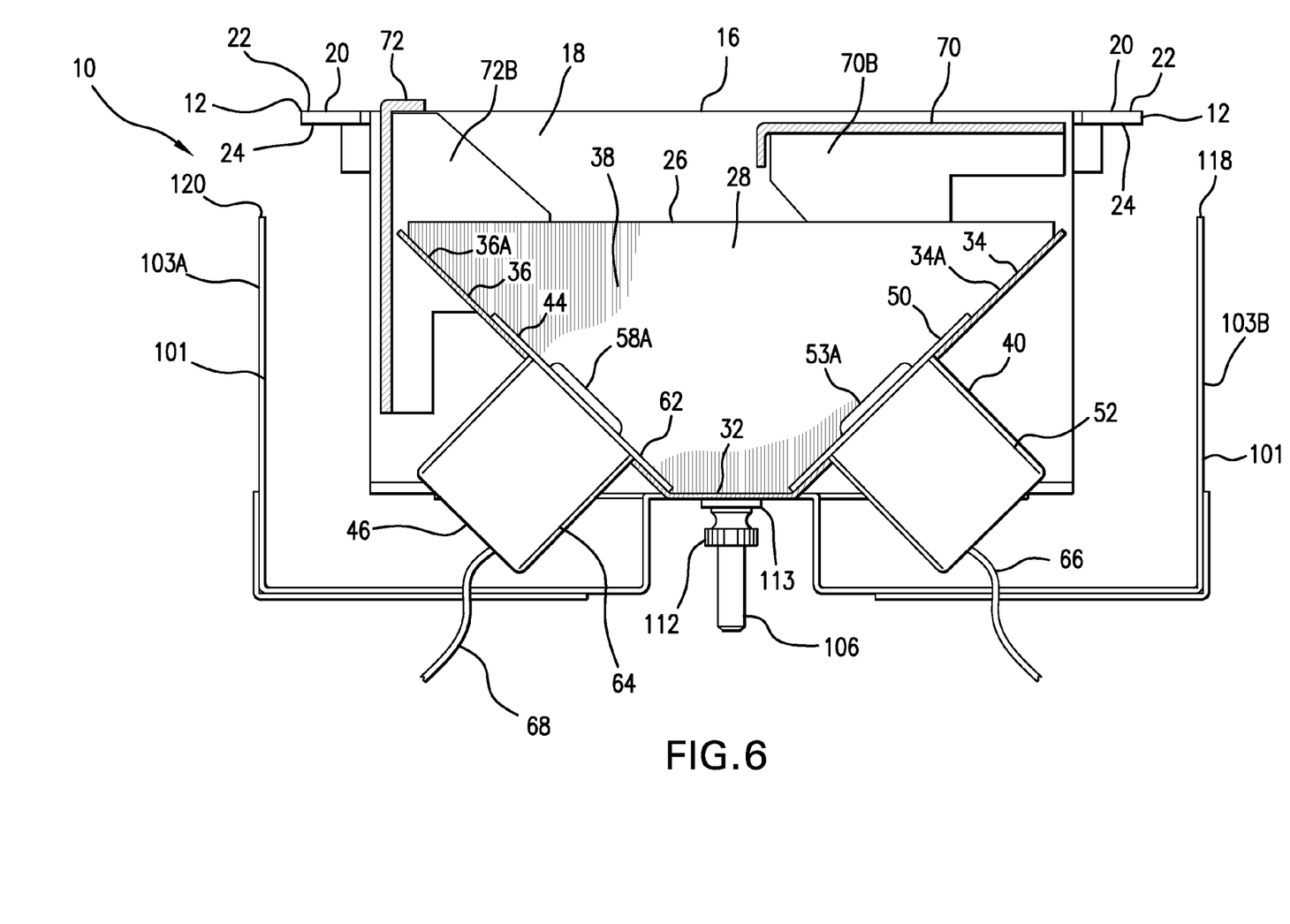
FIG. 6 is a cross-sectional view taken along line 6-6 of FIG. 3A.

Apparatus 10 further comprises inner support structure 26 that is located within spatial region 18 and attached to sidewalls 14 and 16. Inner support structure 26 comprises sidewalls 28 and 30, bottom portion 32, and a pair of lengthwise panels 34 and 36. Lengthwise panels 34 and 36 are attached to sidewalls 28 and 30 and bottom portion 32. Sidewalls 28 and 30, bottom portion 32 and lengthwise panels 34 and 36 define spatial region 38 of inner support structure 26. Each sidewall 28 and 30 has a generally "V" shape such that each lengthwise panel 34 and 36 is angulated with respect to bottom portion 32. As shown in FIGS. 3A and 6, lengthwise panels 34 and 36 are angulated away from each other.

Figure 3B:
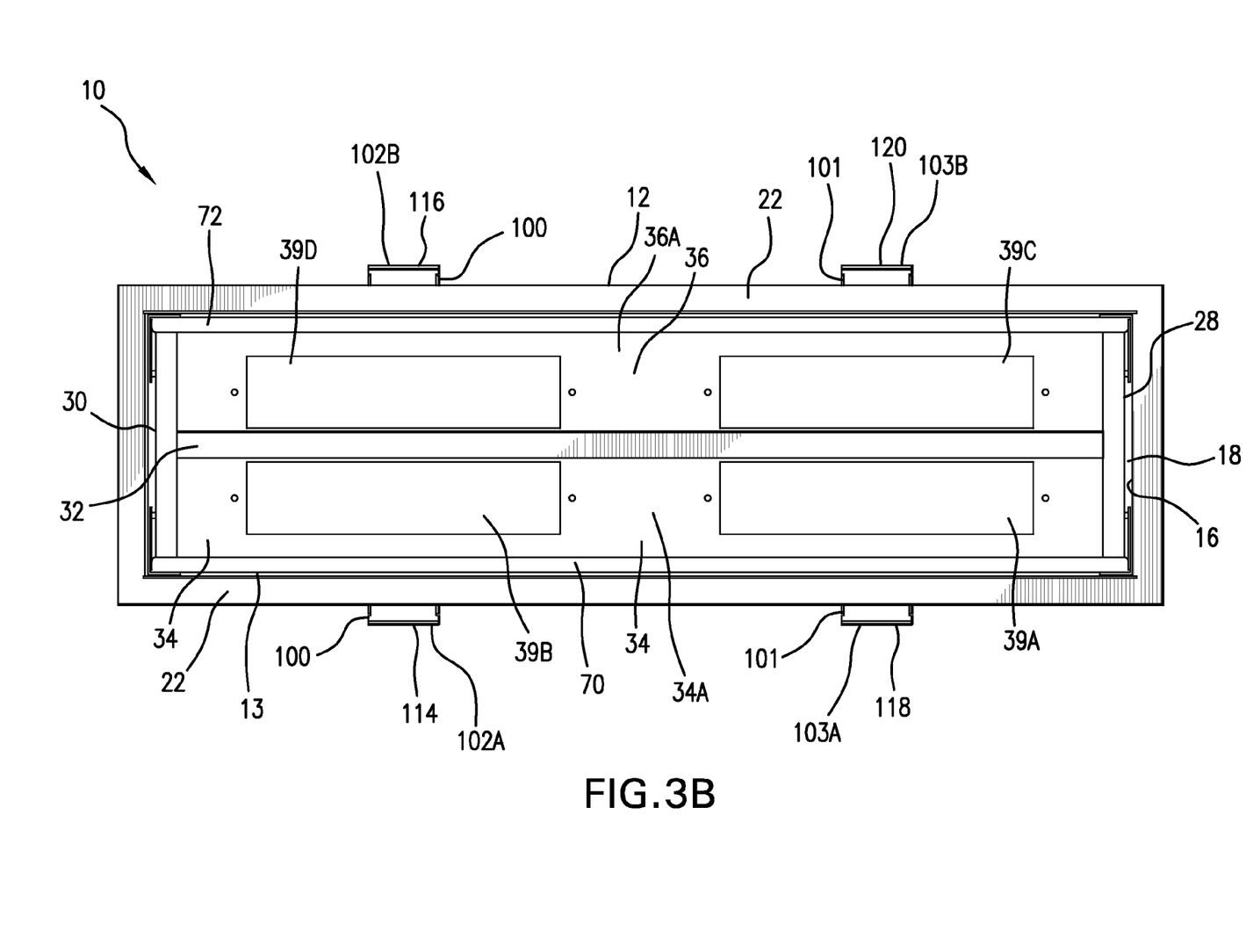
FIG. 3B is a top plan view of the apparatus of FIG. 1, the view being similar to the view of FIG. 3A however this view does not show the utility receptacle modules shown in FIG. 3A.

Referring to FIG. 3B, lengthwise panel 34 has openings 39A and 39B. In a preferred embodiment, each opening 39A and 39B has a square or rectangular shape. Lengthwise panel 36 has openings 39C and 39D. In a preferred embodiment, each opening 39C and 39D has a square or rectangular shape. The purpose of openings 39A-D is discussed in the ensuing description.

Figure 5A:
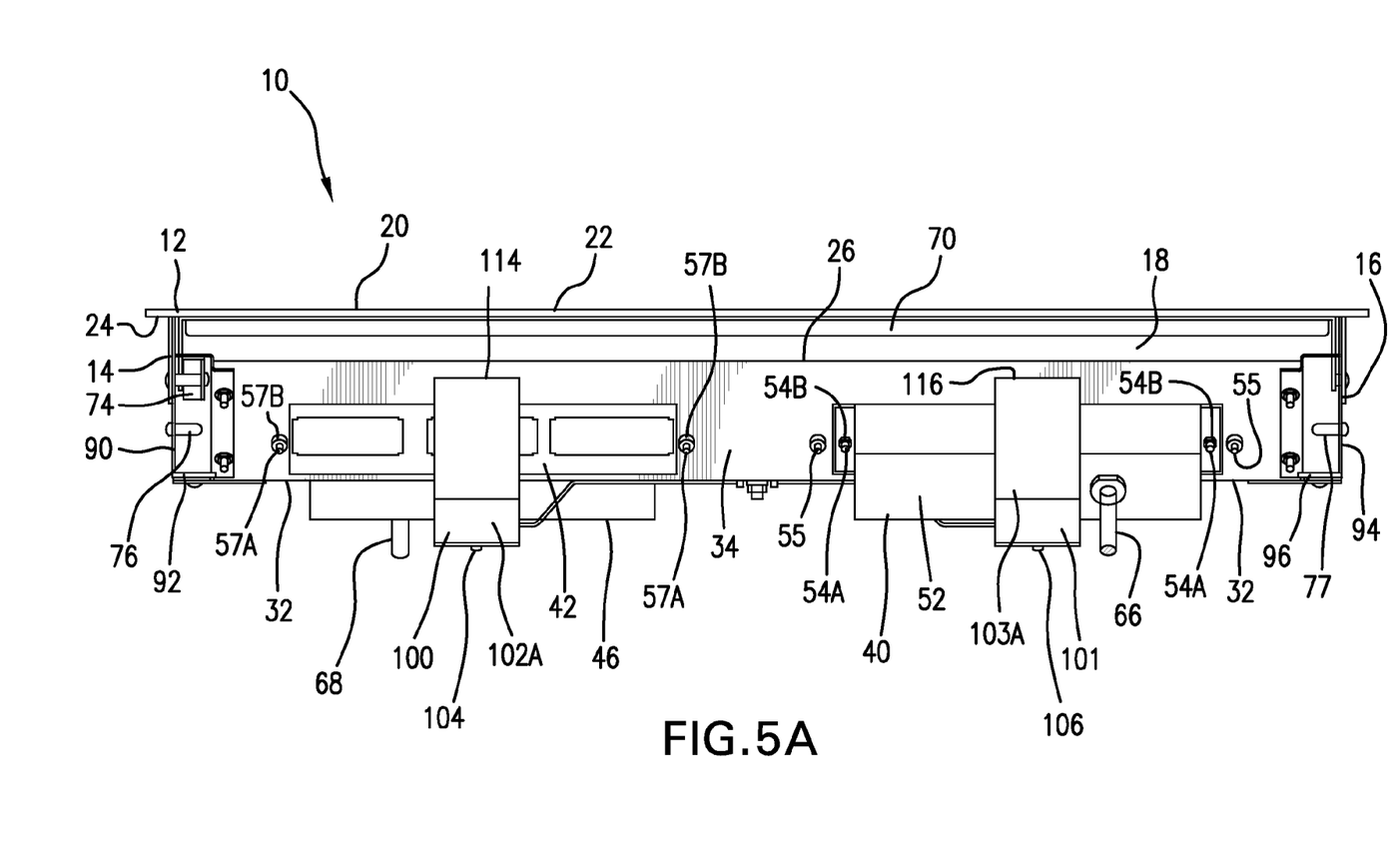
FIG. 5A is a front view of the apparatus of FIG. 1.
Figure 5B:
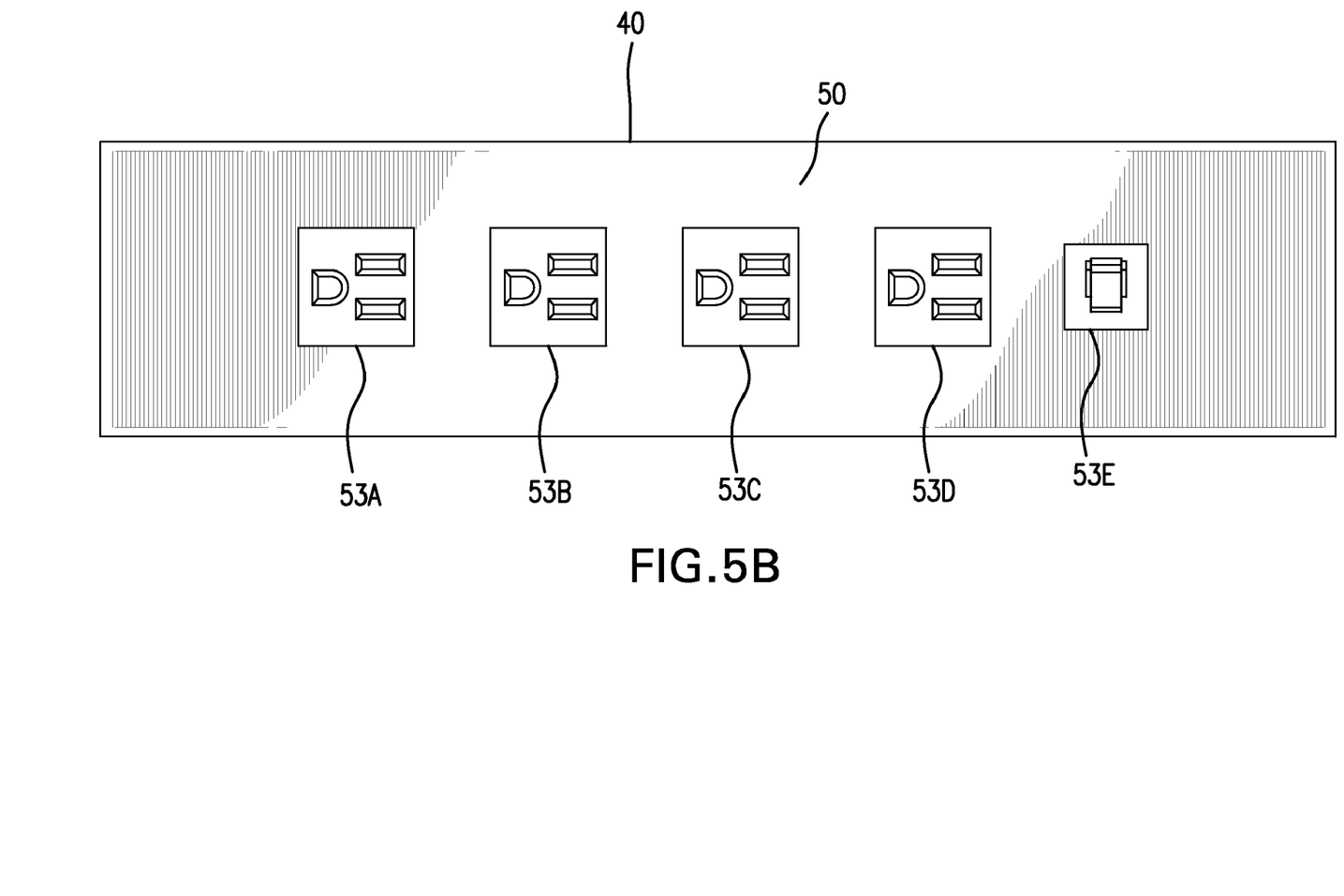
FIG. 5B is a front view of a utility receptacle module shown in FIG. 3A.
Figure 5C:
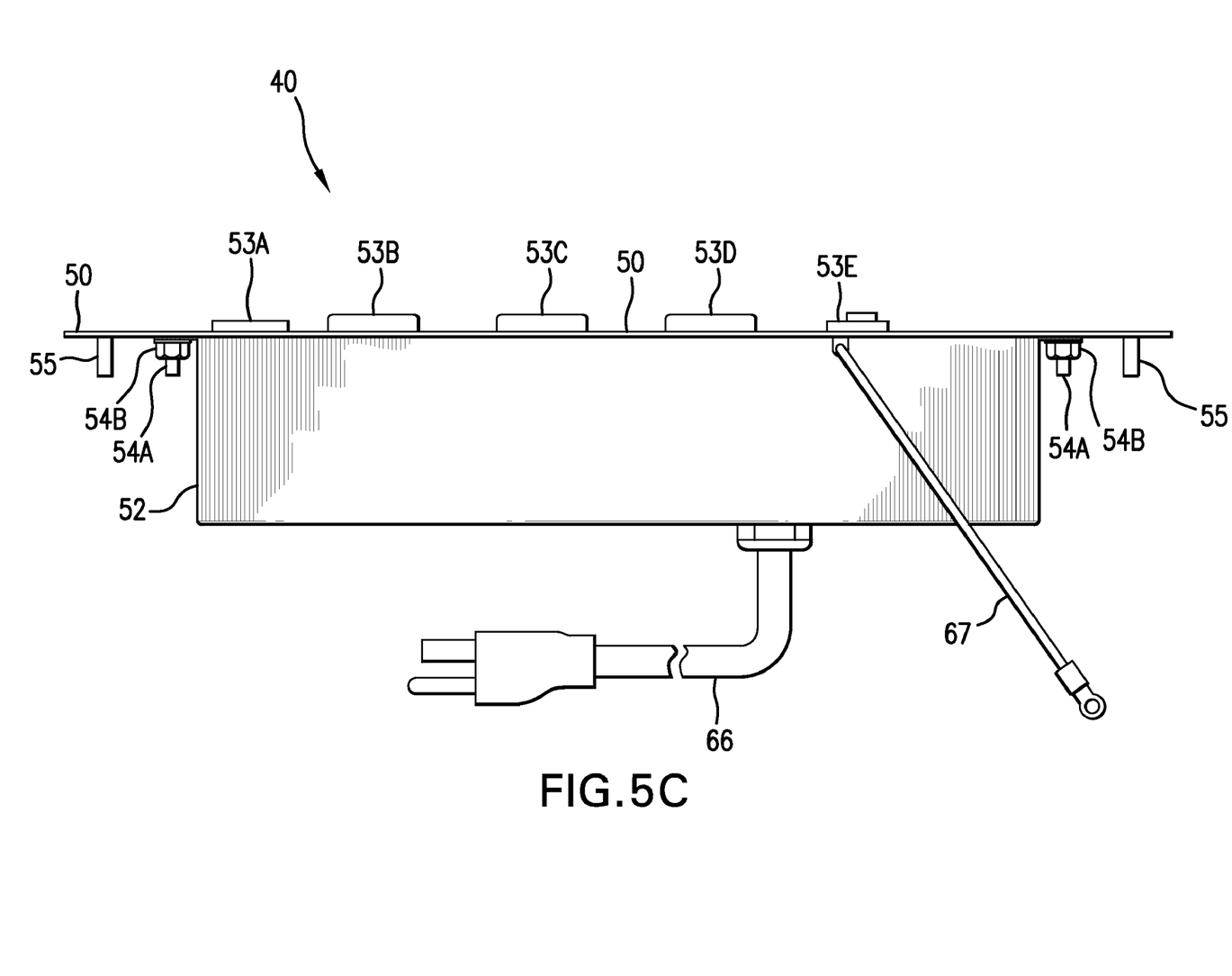
FIG. 5C is a side view of the utility receptacle module shown in FIG. 5B.

Referring to FIGS. 3A, 5A and 6, apparatus 10 further comprises utility receptacle modules 40, 42, 44 and 46. In a preferred embodiment, utility receptacle modules 40 and 42 are removably attached to lengthwise panel 34. Similarly, in a preferred embodiment, utility receptacle modules 44 and 46 are removably attached to lengthwise panel 36. Although the ensuing description is in terms of four utility receptacle modules 40, 42, 44 and 46, it is to be understood that there can be more or less than four utility receptacle modules.

Referring to FIGS. 3A, 3B, 5B, 5C and 6, utility receptacle module 40 has a front panel 50 and rear box 52 that is attached to front panel 50. In a preferred embodiment, rear box 52 is removably attached to the rear side of front panel 50. In one embodiment, screws 54 and corresponding nuts are used to removably attached rear box 52 to front panel 50. Utility receptacles 53A-D are connected to front panel 50. Each utility receptacle 53A-D is an AC power receptacle. Circuit breaker 53E is connected to front panel 50. Rear box 52 covers the rear portions of utility receptacles 53A-D and circuit breaker 53E and the corresponding wiring. In one embodiment, screws 54A and nuts 54B are used to removably attach rear box 52 to front panel 50. Lengthwise panel 34 has a top side 34A. Opening 39A is sized to receive rear box 52 but not front panel 50. Thus, front panel 50 of utility receptacle module 40 abuts or contacts top side 34A of lengthwise panel 34 while rear box 52 extends through opening 39A in lengthwise panel 34. Front panel 50 is removably attached to lengthwise panel 34. In one embodiment, screws 55 and corresponding nuts (not shown) are used to removably attach front panel 50 to lengthwise panel 34. Rear box 52 and front panel 50 form a compartment that prevents or shields the emission of electromagnetic interference (EMI) or radio frequency interference (RFI) that may be carried on cables or wires 66 that are electrically connected to utility receptacles 53A-D (see FIGS. 5A and 5C). Utility receptacle module 40 includes grounding wire 67.

Referring to FIG. 3A, utility receptacle module 42 has utility receptacles 56A-C. Utility receptacle module 42 is removable attached to the rear side of lengthwise panel 34 such that utility receptacles 56A-C are located within opening 39B in lengthwise panel 34. Utility receptacle 56A is a data signal connector, such as an RS-232 connector. Utility receptacle 56B is a dual telephone line receptacle or jack. Utility receptacle 56C is a USB port. Wires (not shown) are connected to the electrical contacts (not shown) on the rear of utility receptacles 56A-C. In one embodiment, screws 57A and corresponding nuts 57B are used to removably attach utility receptacle module 42 to lengthwise panel 34.

Referring to FIG. 3A, utility receptacle module 44 has utility receptacles 58A-C. Utility receptacle module 44 is removable attached to the rear side of lengthwise panel 36 such that utility receptacles 58A-C are located within opening 39C in lengthwise panel 36. Utility receptacle 58A is a dual telephone receptacle or jack. Utility receptacle 58B is a data signal connector, such as an RS-232 connector. Utility receptacle 58C is another dual telephone line receptacle or jack. In one embodiment, screws and corresponding nuts (not shown) are used to removably attach utility receptacle module 44 to lengthwise panel 36.

Referring to FIGS. 3A and 3B, utility receptacle module 46 comprises a front panel 62 and a rear box 64. In a preferred embodiment, rear box 64 is removably attached to the rear side of front panel 62. Utility receptacles 60A-D are connected to front panel 62. Each utility receptacle 63A-D is an AC power receptacle. Circuit breaker 60E is connected to front panel 62. Rear box 62 covers the rear portions of utility receptacles 60A-D and circuit breaker 63E and the corresponding wiring. In one embodiment, screws and corresponding nuts (not shown) are used to removably attach rear box 64 to front panel 62. Lengthwise panel 36 has a top side 36A. Opening 39D in lengthwise panel 36 is sized to receive rear box 64 but not front panel 62. Thus, front panel 62 of utility receptacle module 46 abuts or contacts top side 36A of lengthwise panel 36 while rear box 64 extends through opening 39D in lengthwise panel 36. Front panel 62 is removably attached to lengthwise panel 36. In one embodiment, screws and corresponding nuts (not shown) are used to removably attach front panel 62 to lengthwise panel 36. Front panel 62 and rear box 64 cooperate to form a compartment to shield or prevent emission of EMI or RFI that may be carried on the wire or cable 68 that is connected to utility receptacles 60A-D (see FIG. 5A).

Thus, the compartments of utility receptacle modules 40 and 46 substantially prevent EMI and/or RFI from affecting the utility receptacles carrying digital data signals.

As shown in FIGS. 3A and 6, each utility receptacle of utility receptacle modules 40, 42, 44 and 46 is within and accessible through spatial region 38 of inner support structure 26.

An advantage and benefit of the particular configuration of apparatus 10 as described in the ensuing description is that utility receptacle modules 40, 42 and 44, 46 are removably attached to lengthwise panels 34 and 36, respectively. This configuration allows the utility receptacle modules to be interchanged or replaced with other utility receptacle modules having other types of utility receptacles. For example, utility receptacle module 40 can be removed from lengthwise panel 34 and replaced with a utility receptacle module having all USB ports, or a combination of RS-232 connectors and USB ports. Thus, the interchangeability of utility receptacle modules 40, 42, 44 and 46 allows a user to customize apparatus 10 to his or her particular needs.

Figure 7:
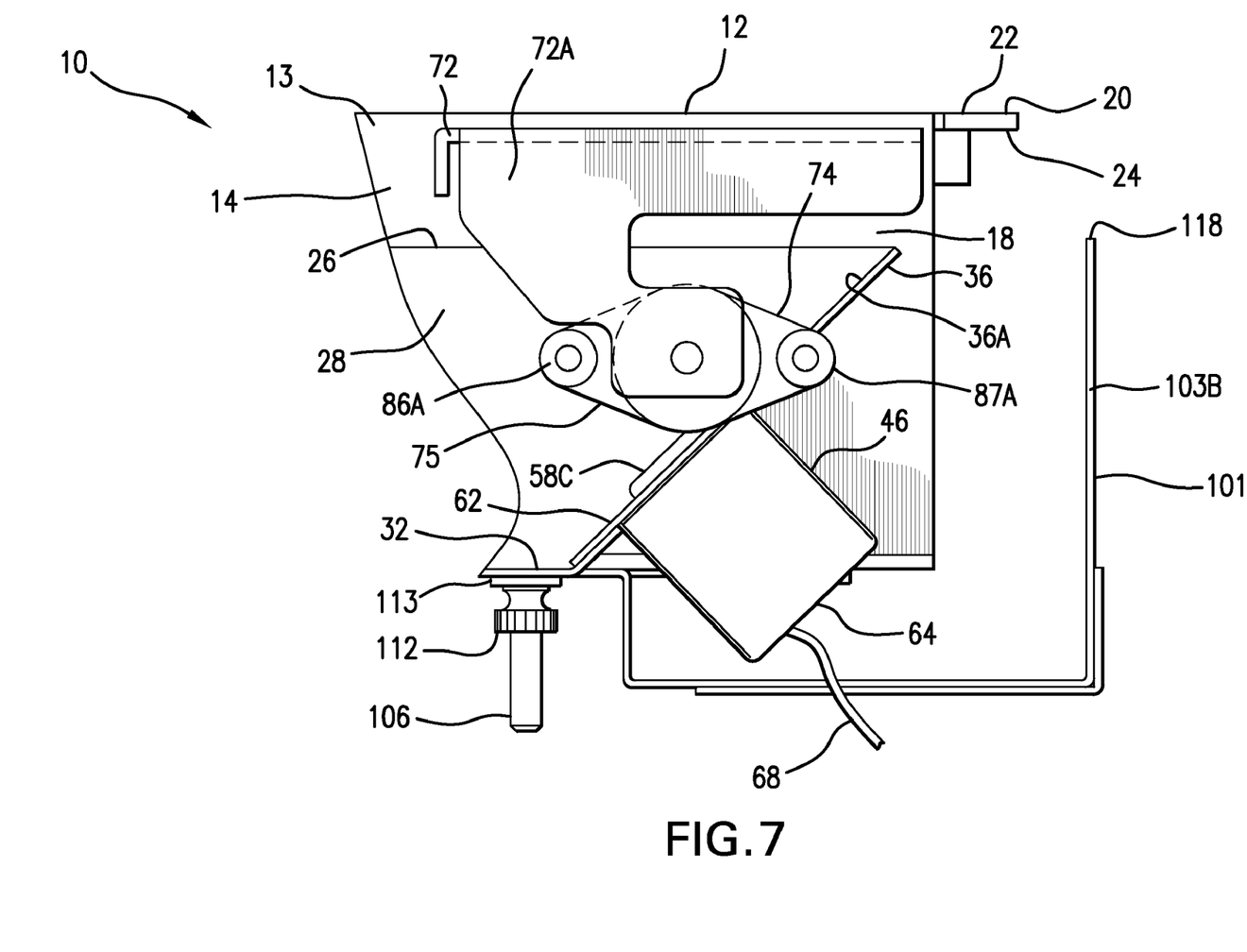
FIG. 7 is a partial view of the right side of the apparatus, the right sidewalls of the housing and inner support structure not being shown so as to facilitate viewing of one of the lid members and a corresponding motion damper device.

Referring to FIGS. 1, 2, 7, 9 and 10, apparatus 10 further comprises a lid member 70. Lid member 70 has side portions 70A and 70B. Apparatus 10 further comprises lid member 72. Lid member 72 has side portions 72A and 72B. Apparatus 10 further comprises motion damper devices 74 and 75. Motion damper device 74 is attached to sidewall 14 and motion damper device 75 is attached to sidewall 16. Side portion 70A of lid member 70 is pivotally attached to sidewall 14 and motion damper device 74. Side portion 70B of lid member 70 is pivotally attached to sidewall 16 of housing 12. Similarly, side portion 72B of lid member 72 is pivotally attached to sidewall 16 of housing 12 and motion damper device 75. Side portion 72A of lid member 72 is pivotally attached to sidewall 14 of housing 12. Motion damper devices 74 and 75 dampen the pivotal movement of lid members 70 and 72 so as to allow a smooth, controlled, pivotal movement of the lid members 70 and 72. FIG. 7 shows a view of the right side of the apparatus without sidewall 16 of housing 12 being shown and without sidewall 30 of inner support structure 26 being shown so as to facilitate viewing of the interconnection of lid member 72 and motion damper device 75. In an alternate embodiment, motion damper devices 74 and 75 are not used.

Bumper members, such as bumper members 76 and 77, are attached to sidewalls 14 and 16, respectively. Lid member 70 contacts bumper members 76 and 77 when lid member 70 is opened to its fullest extent. Another pair of bumper members, not shown, are attached to sidewalls 14 and 16, respectively, so that lid member 72 contacts these bumper members (not shown) when lid member 72 is opened to its fullest extent.

As shown in FIG. 1, lid members 70 and 72 extend lengthwise and are bounded by peripheral portion 20. Each lid members 70 and 72 covers a respective portion of spatial region 38 of inner support structure 26. Each lid member 70 and 72 is movable between a closed position and an open position that provides access to spatial region 38 and thus, access to the utility receptacles of utility receptacle modules 40, 42, 44 and 46. Lid members 70 and 72 are sized so that when lid members 70 and 72 are in the closed position, gap 80 exists between lid members 70 and 72. The gap 80 is sized to permit wires or cables to pass therethrough. Thus, wires or cables that are connected to electrical equipment (not shown) can pass through the gap 80 and remain connected to utility receptacles 53A-D and/or 56A-C and/or 58A-C and/or 60A-D when lid members 70 and 72 are closed.

Figure 9:
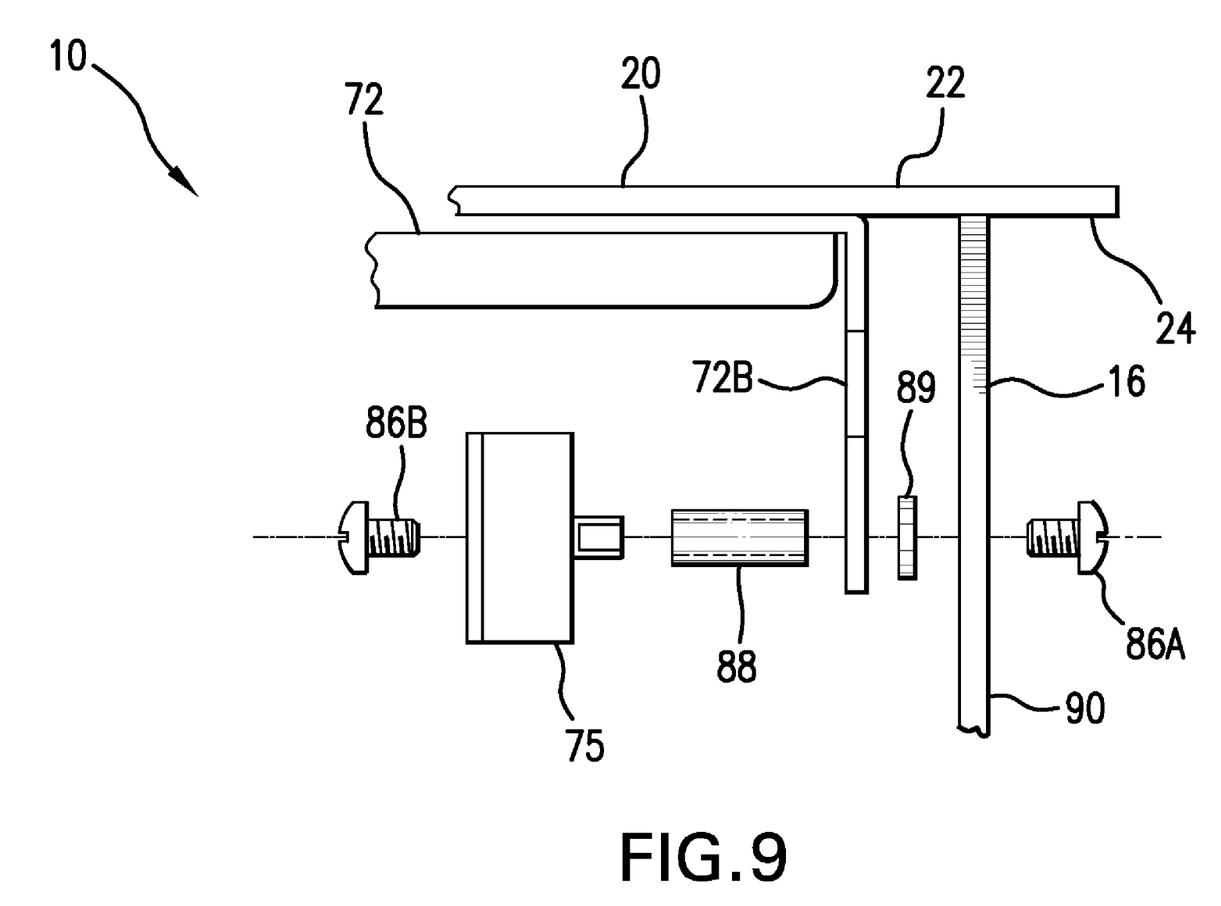
FIG. 9 is an exploded view showing the interconnection of the lid member and motion damper device of FIG. 7, the view not showing the inner support structure of the apparatus so as to facilitate viewing of the aforesaid lid member and motion damper device.
Figure 10:
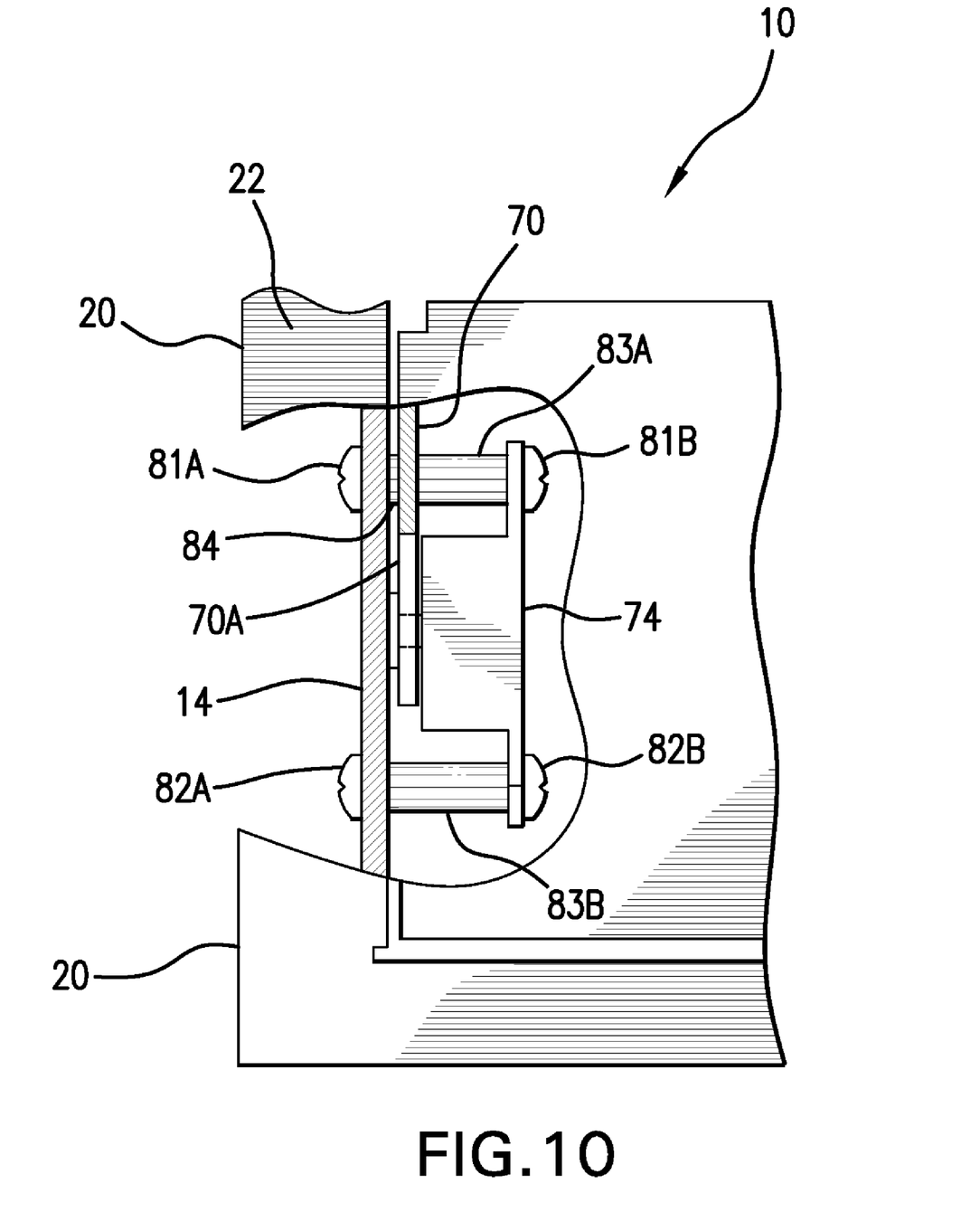
FIG. 10 is a top view, partially in cross-section, of the left end portion of the apparatus of FIG. 1, the view showing the interconnection of the lid member and motion damper device, the view not showing the inner support structure in order to facilitate viewing of the lid member and motion damper device.

Referring to FIGS. 9 and 10, in one embodiment, each motion damper device 74 and 75 is removably attached to sidewalls 14 and 16 with screws and spacers. For example, in FIG. 10, there is shown a top view of the left hand portion of apparatus 10. Motion damper device 74 is removably attached to sidewall 14 with complementary screws or fasteners 81A, 81B and 82A, 82B, and spacers 83A, 83B and 84. Spacer 84 is positioned between sidewall 14 and sidewall 70A of lid member 70. FIG. 9 is a side view showing motion damper device 75 removably attached to sidewall 16. Specifically, two pairs of complementary screws or fasteners are used to removably attach motion damper device 75 to sidewall 16. One of these aforesaid pairs of complementary fasteners comprises fasteners 86A and 86B, and the second pair of complementary fasteners comprises fastener 87A (see FIG. 4) and another fastener that is not shown. A pair of spacers, one of which being spacer 88, is used to attach motion damper device 75 to sidewall 16. An additional spacer 89 is positioned between sidewall 72B of lid member 72 and sidewall 16. Motion damper devices 74 and 75 dampen the pivoting or rotating movement of lid members 70 and 72.

Figure 8:
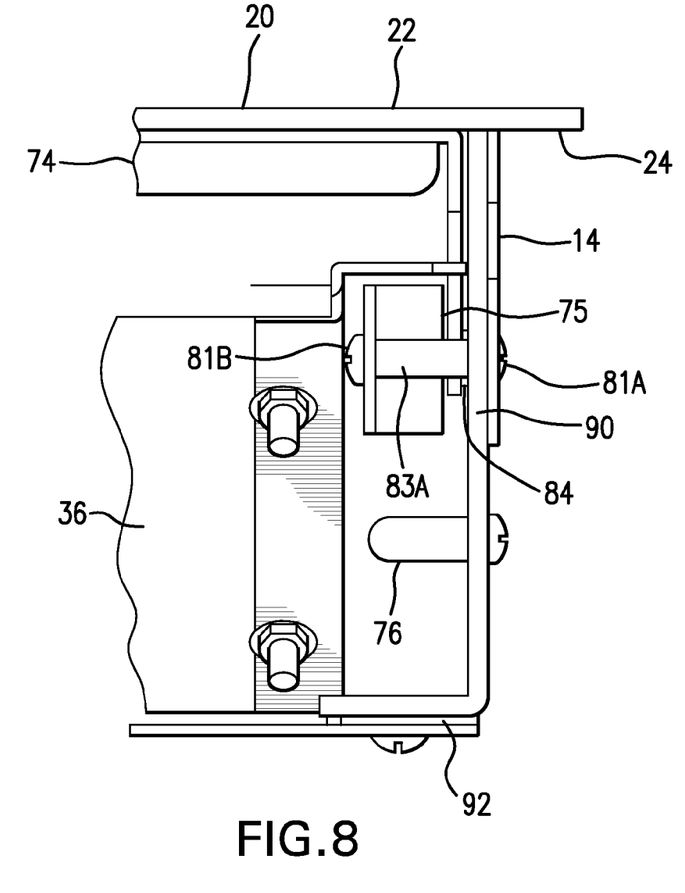
FIG. 8 is a partial, rear view of the apparatus of FIG. 1, the viewing showing the left end portion of the apparatus and in particular, the interconnection between the other lid member and corresponding motion damper device.

Referring to FIGS. 5A and 8, sidewall 14 has a generally vertical portion 90 and lower portion 92 that is angulated with respect to vertical portion 90. In one embodiment, lower portion 92 is generally perpendicular to generally vertical portion 90. Similarly, sidewall 16 has a generally vertical portion 94 and lower portion 96 that is angulated with respect to vertical portion 94. In one embodiment, lower portion 96 is generally perpendicular to generally vertical portion 94. Bottom portion 32 of inner support structure 26 is attached to and supported by lower portions 92 and 96 of sidewalls 14 and 16, respectively.

Referring to FIGS. 2, 4, 5A, and 6, apparatus 10 further comprises clamp devices 100 and 101 that are removably and adjustably attached to the bottom portion 32 of inner support structure 26. Clamp device 100 has upwardly extending portions 102A and 102B. Similarly, clamp device 101 has upwardly extending portions 103A and 103B. Threaded members 104 and 106 extend downward from bottom portion 32 of inner support structure 26. Clamp device 100 has opening 108 therein to receive threaded member 104. Similarly, clamp device 101 has opening 109 therein to receive threaded member 106. Nut 110 is configured to be threadedly engaged to threaded member 104 in order to removably attach clamp device 100 to apparatus 10. Washer 111 is interposed between nut 110 and clamp device 100. Similarly, nut 112 is configured to be threadedly engaged to threaded member 106 in order to removably attach clamp device 101 to apparatus 10. Washer 113 is interposed between nut 112 and clamp device 101. Each clamp device 100 has and top edges 114 and 116. Similarly, clamp device 101 has top edges 118 and 120. The purpose of top edges 114, 116 and 118, 120 are described in the ensuing description.

Figure 11:
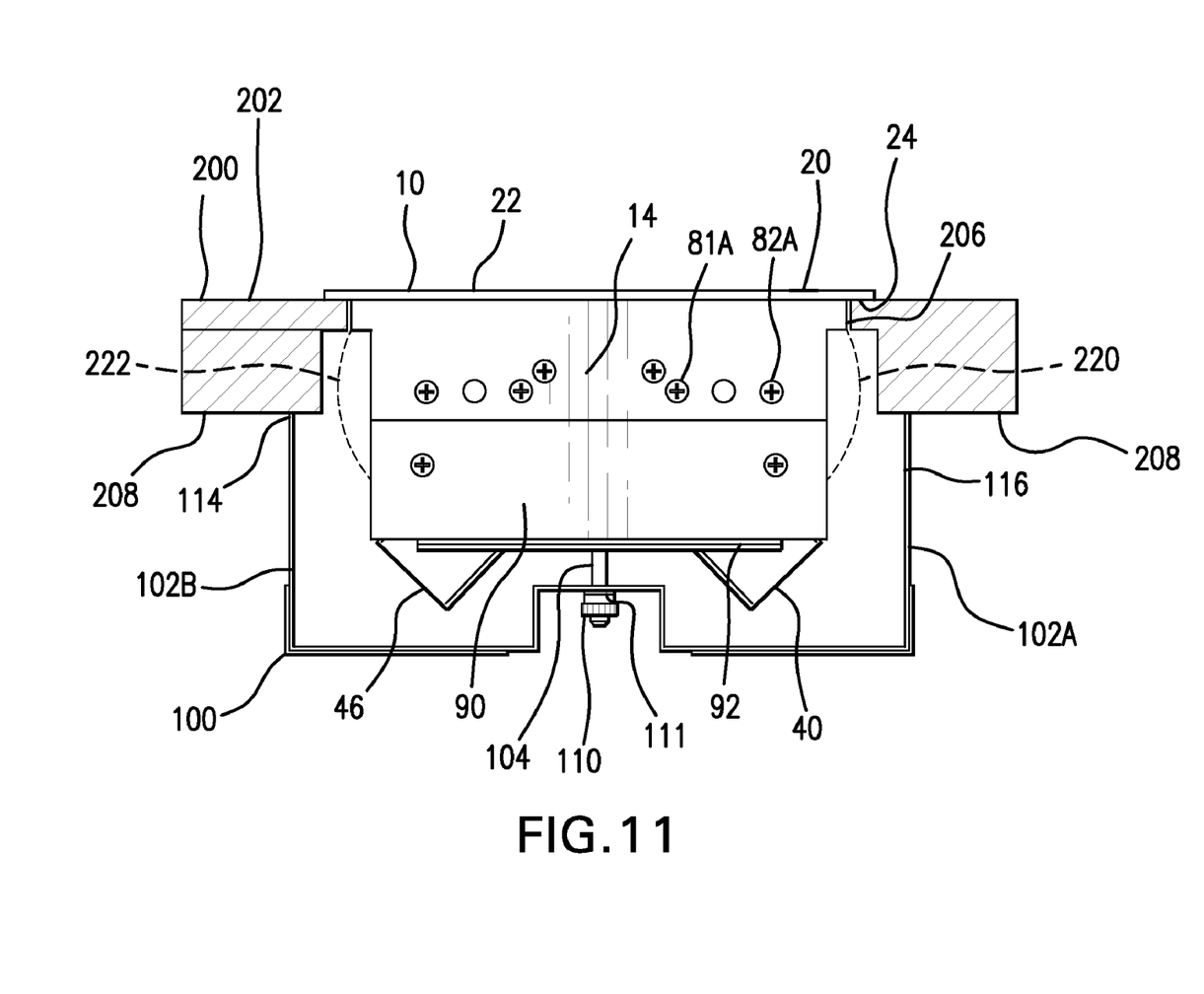
FIG. 11 is a side view, partially in cross-section, showing the apparatus of FIG. 1 mounted to a work station.

Referring to FIGS. 2 and 11, apparatus 10 is configured to be used with work station 200. Work station 200 has a work surface 202, through-hole or opening 206, and underside 208. Housing 12 is sized to fit into opening 206 in work surface of work station 200 such that bottom surface 24 of peripheral portion 20 of housing 10 contacts work surface 202 and prevents housing 10 from completely falling through opening 206 in work surface 202. When nuts 110 and 112 are completely tightened, top edges 114, 116 of clamp devices 100 and top edges 118 and 120 of clamp device 101 contact underside 208 of workstation 200. Thus, clamp devices 100 and 102 hold apparatus 10 steady thereby preventing any movement of apparatus 10 with respect to work station 200. In order to remove apparatus 10 from work station 200, nuts 110 and 112 are removed from threaded members 104 and 106, respectively. Apparatus 10 can then be lifted out of opening 206 in work station 200. In FIG. 11, dotted lines 220 and 222 represent the path through which the rear portions of lid members 70 and 72, respectively, travel as the lid members 70 and 72 are opened and closed.

In an alternate embodiment, apparatus 10 does not use threaded members 104 and 106 and clamp devices 100 and 102.

In an alternate embodiment, utility receptacle modules 40, 42 and 44, 46 are rigidly attached to lengthwise panels 34 and 36, respectively.

Apparatus 10 can be fabricated from a variety of suitable materials. Examples of such materials are aluminum, stainless steel, steel, etc. Other suitable materials may be used. Utility receptacle modules 40, 42, 44 and 46 may be configured to have any number of utility receptacles. In one embodiment, utility receptacles that carry computer data signals are not in the same utility receptacle module that also has utility receptacles that provide electrical power.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the invention. Accordingly, the foregoing detailed description should be considered as exemplary in nature and not as limiting the scope and spirit of the invention as set forth in the attached claims.

What is claimed is:

1. An apparatus for dispensing utilities at a selected location of a work station that has a work surface, comprising:
   a housing having an upper peripheral portion and a pair of oppositely positioned sidewalls extending downwardly from the peripheral portion, the housing defining a spatial region between the sidewalls and having an opening bounded by the peripheral portion and in communication with the spatial region, wherein all of the housing except the peripheral portion is sized to fit into an opening in a work surface of a work station so that the peripheral portion contacts the work surface in order to prevent the apparatus from dropping through the opening in the work surface;

an inner support structure positioned between and attached to the sidewalls of the housing and located within the spatial region of the housing, the inner support structure having sidewalls, a bottom portion and a pair of lengthwise panels that define a spatial region of the inner support structure, the inner support structure having a "V" shape cross-section such that the lengthwise panels are angulated with respect to the bottom portion and away from each other, wherein each lengthwise panel has substantially the same degree of angulation with respect to the bottom portion;

at least one utility receptacle module removably attached to each lengthwise panel, the utility receptacle module having at least one utility receptacle that is in communication with and accessible through the spatial region of the inner support structure; a cable extending from the utility receptacle module, the cable being in electrical signal communication with the utility receptacle; each utility receptable module further comprising a front panel having the utility receptacle, and a rear box attached to the front panel so as to form a compartment, wherein the rear box has an opening therein for receiving the cable, and wherein each lengthwise panel has a cut-out therein that is sized for receiving the rear box of the utility receptacle module but not the front panel, the front panel being generally parallel with and attached to the lengthwise panel;

a pair of lid members pivotally attached to the sidewalls of the housing, each lid member being movable between a closed position and an open position that provides access to the spatial region of the inner support structure and the utility receptacles, wherein the lid members are sized so that when the lid members are in the closed position, a gap exists between the lid members for the passage therethrough of wires or cables that are connected to the utility receptacles;

means for dampening the motion of each of the lid members; and means for securing the apparatus to the work station.

* * * * *